(12) United States Patent
Zhang et al.

(10) Patent No.: US 7,778,550 B2
(45) Date of Patent: Aug. 17, 2010

(54) SYSTEM AND METHOD FOR WAVELENGTH MONITORING AND CONTROL

(75) Inventors: Hongbin Zhang, Marlboro, NJ (US); Ralph Brian Jander, Freehold, NJ (US); Carl R Davidson, Warren, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 480 days.

(21) Appl. No.: 11/829,458

(22) Filed: Jul. 27, 2007

(65) Prior Publication Data
US 2009/0028552 A1 Jan. 29, 2009

(51) Int. Cl.
*H04J 14/02* (2006.01)

(52) U.S. Cl. ............... 398/95; 398/93; 398/196; 398/197

(58) Field of Classification Search ........... 398/182, 398/183, 192, 193, 194, 195, 196, 197, 198, 398/199, 200, 201, 158, 159, 17, 22, 23, 398/24, 25, 26, 27, 33, 38, 34, 36, 93, 94, 398/95
See application file for complete search history.

(56) References Cited

U.S. PATENT DOCUMENTS

| 4,989,201 | A  | * | 1/1991  | Glance ............... 398/95 |
| 5,243,474 | A  |   | 9/1993  | Mitsuhashi |
| 6,281,995 | B1 | * | 8/2001  | Spickerman et al. ........ 398/9 |
| 6,396,603 | B1 | * | 5/2002  | Kim ................ 398/91 |
| 6,567,198 | B1 | * | 5/2003  | Kang ............... 398/91 |
| 6,829,410 | B1 |   | 12/2004 | Zeng |
| 2003/0007246 | A1 | | 1/2003 | Zhao |
| 2006/0159002 | A1 | | 7/2006 | Kim et al. |

OTHER PUBLICATIONS

International Search Report and Written Opinion dated Oct. 14, 2008 issued in related International Patent Application No. PCT/US08/71396.

* cited by examiner

*Primary Examiner*—Hanh Phan
(74) *Attorney, Agent, or Firm*—Grossman, Tucker, Perreault & Pfleger, PLLC

(57) ABSTRACT

A system and method using for wavelength monitoring and control in a WDM optical communication system. An aggregate channel monitor detects crosstalk between channels in the aggregate signal. Channel spacing may be modified by an element management system in response to the output of the aggregate channel monitor.

20 Claims, 7 Drawing Sheets

SYSTEM AND METHOD FOR WAVELENGTH MONITORING AND CONTROL

TECHNICAL FIELD

The present application relates to communication systems and, more particularly, to a system and method for wavelength monitoring and control in optical communication systems.

BACKGROUND

In wavelength division multiplexed (WDM) optical communication systems several optical channels may be transmitted on a single optical fiber with narrow channel spacing, for example, less than 25-35 GHz. To mitigate crosstalk between channels, it may be important to accurately and reliably position the frequency for each channel within a small range around a fixed frequency grid. The frequency grid might be an absolute grid, e.g., based on International Telecommunication Union (ITU) standards, or a relative grid determined, for example, by one or more filters.

To position channel frequencies, a wavelength monitor may be used. In general, it may be desirable that a wavelength monitor position channel frequencies without creating significant system transmission penalties. It may also be desirable for a wavelength monitor to co-operate with combinations of various equipment generations and configurations. For example, it may be useful for a wavelength monitor to establish channel frequencies in mixed systems with signals of different modulation formats, such as On-Off-Keying (OOK) and differential phase-shift-keying (DPSK).

BRIEF DESCRIPTION OF THE DRAWINGS

Reference should be made to the following detailed description which should be read in conjunction with the following figures, wherein like numerals represent like parts.

DETAILED DESCRIPTION

Figure 1:
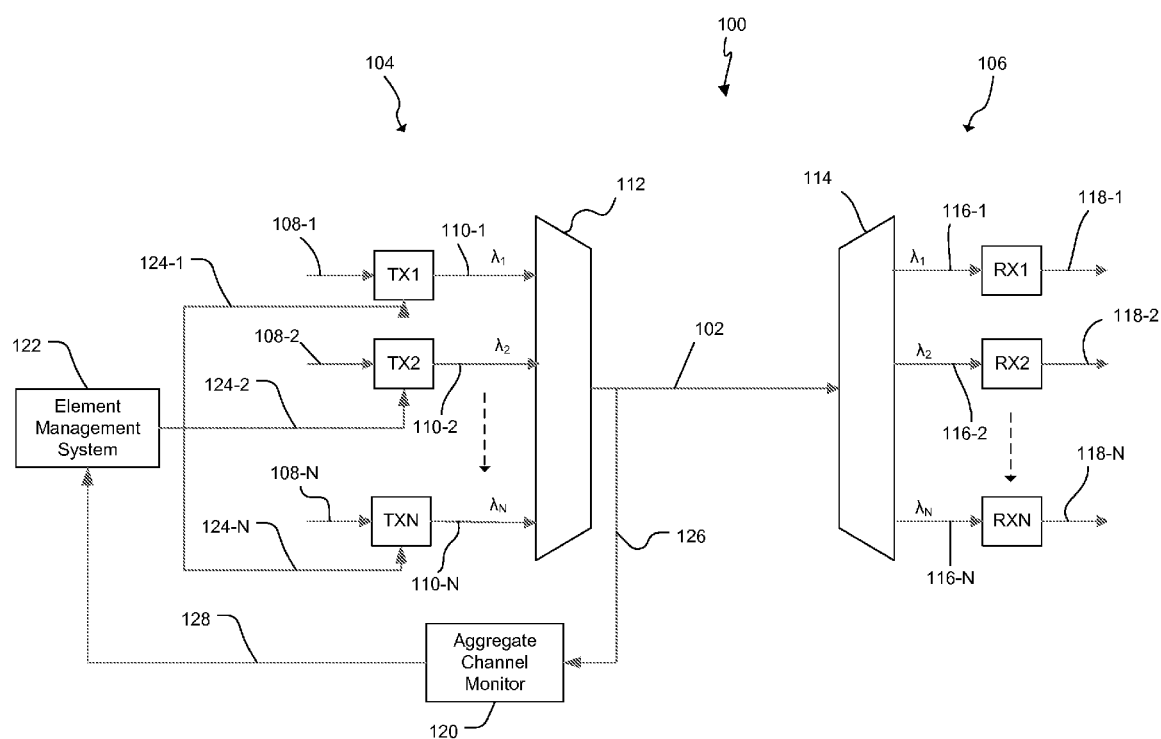
FIG. 1 is a simplified block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical communication path 102 from a transmitting terminal 104 to one or more remotely located receiving terminals 106. Those of ordinary skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the present disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receive a data signal on an associated input port 108-1, 108-2 . . . 108-N, and transmit the data signal on associated wavelength $\lambda_1, \lambda_2 \ldots \lambda_N$. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels may by separated by a predetermined channel separation, e.g. 25 or 35 GHz, corresponding to an International Telecommunication Union (ITU) frequency grid. One or more of the transmitters TX1, TX2 . . . TXN may be configured to modulate data on associated wavelengths with a first modulation format, e.g. OOK, while one or more of the other transmitters TX1, TX2 . . . TXN may be configured to modulate data on associated wavelengths with a second modulation format, e.g. DPSK, different from the first modulation format. Such a configuration may be provided, for example, in an upgrade configuration, wherein new channels are added with a modulation format different from the previously installed channels.

The transmitted wavelengths or channels are respectively carried on a plurality of paths 110-1, 110-2 . . . 110-N. The channels are combined into an aggregate signal on optical communication path 102 by a multiplexer 112. The optical communication path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. The receivers RX1, RX2 . . . RXN may be configured to demodulate the signals to provide associated output data signals on associated output paths 118-1, 118-2, 118-3, 118-N.

Consistent with the present disclosure, the system 100 includes an aggregate channel monitor 120 and an element management system 122. In general, the aggregate signal on path 102 may be coupled, e.g. using a 10% tap, to an input of the aggregate channel monitor 120 through path 126. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The aggregate channel monitor 120 may be configured to provide an output 128 to the element management system 122 representative of the crosstalk, i.e. adjacent channel interference, occurring between respective channels of the aggregate signal on path 102. The element management system 122 may be configured to provide one or more outputs 124-1, 124-2 . . . 124-N to the transmitters TX1, TX2 . . . TXN for modifying the wavelengths $\lambda_1, \lambda_2 \ldots \lambda_N$ in response to the output 128 while keeping the channels within a defined tolerance associated with the predetermined channel separation. In one embodiment, the wavelengths may be maintained within 2.25 GHz or less of the wavelengths $\lambda_1, \lambda_2 \ldots \lambda_N$ associated with the predetermined channel separation.

The aggregate channel monitor 120 may provide an output 128 representative crosstalk between the channels in the aggregate signal using optical components. The output 128 may be established using a comb filter having a transmission characteristic with center frequencies centered on the crosstalk between adjacent channels. The comb filter may therefore establish a periodic, thermal-stable grid corresponding to the predetermined channel separation for transmitting crosstalk between channels. The output 128 of the aggregate channel monitor may cause the element management system to establish a relative channel spacing in the aggregate signal on path 102 to minimize or equalize crosstalk, thereby positioning the channels according to the grid defined by the comb-filter.

Figure 2:
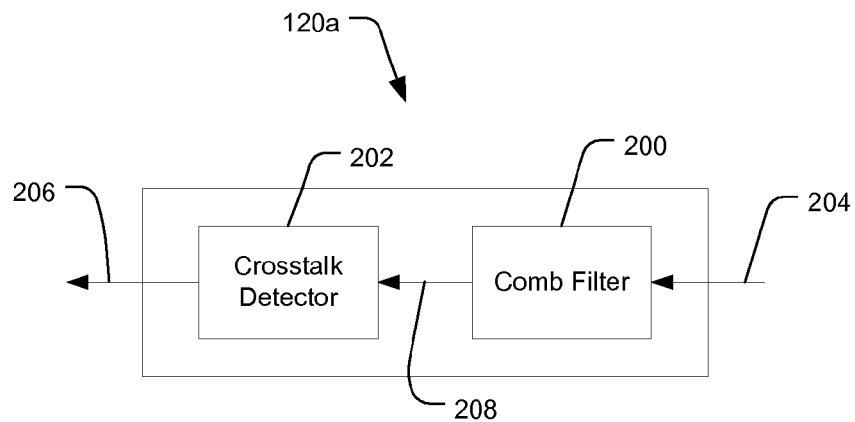
FIG. 2 is a simplified block diagram of one exemplary aggregate channel monitor consistent with the present disclosure.

Turning to FIG. 2, for example, there is illustrated a simplified block diagram of one exemplary embodiment 120a of an aggregate channel monitor consistent with the present disclosure. The illustrated exemplary embodiment includes a comb filter 200 coupled to a crosstalk detector 202. The aggregate signal from path 102 may be provided as an input 204 to the comb filter 200. The comb filter 200 may receive the aggregate signal and provide an output 208 to the crosstalk detector 202 representative of the crosstalk between adjacent channels in the aggregate signal.

The crosstalk detector 202 may take a known detector configuration and may receive the comb filter output 208 and detect the power and/or level of the crosstalk between adjacent channels to provide an output 206 representative of the crosstalk between adjacent channels. The crosstalk detector output 206 may be coupled to the element management system 122, which may modify transmitter settings to position the wavelengths $\lambda_1, \lambda_2 \ldots \lambda_N$ in a manner that minimizes or equalizes crosstalk between adjacent channels.

Figure 3:
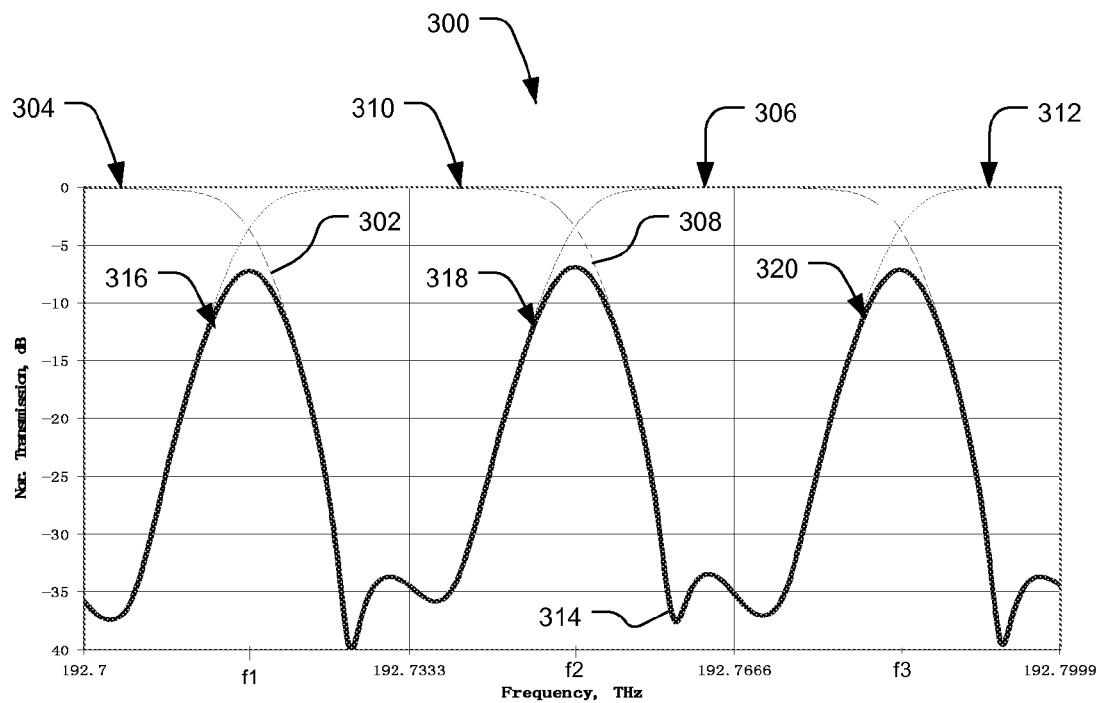
FIG. 3 includes of plot frequency vs. relative power illustrating operation of an aggregate channel monitor consistent with the present disclosure.

FIG. 3 for example includes plots 300 of frequency vs. relative power illustrating operation of an aggregate channel monitor 120 consistent with the present disclosure. Plot 302 illustrates the power spectrum of first 304 and second 306 odd numbered channels, e.g. of an aggregate channel on path 102, centered at 192.7 THz and 192.7666 THz, respectively, and plot 308 illustrates the power spectrum of first 310 and second 312 even numbered channels centered at 192.7333 THz and 192.7999 THz, respectively. Plot 314 illustrates the crosstalk power spectrum for the crosstalk between the channels 304, 306, 310 and 312. In particular, section 316 of plot 314 illustrates the crosstalk power between channels 304 and 310, section 318 of plot 314 illustrates the crosstalk power between channels 310 and 306, and section 320 of plot 314 illustrates the crosstalk power between channels 306 and 312.

Each channel in the aggregate signal on path 102 may be said to have associated low and high frequency crosstalk side bands associated therewith. In the FIG. 3, for example, portion 316 of plot 314 represents a low-frequency crosstalk side band associated with channel 310 and portion 318 represents a high-frequency crosstalk side band associated with channel 310. Likewise, portions 318 and 320 of plot 314 represent the low and high frequency side bands associated with channel 306.

The comb filter 200 may have a transmission characteristic with center frequencies centered on each of the crosstalk sidebands. With reference to the exemplary embodiment of FIG. 3, for example the transmission characteristic of the comb filter 200 may have center frequencies at f1, f2, f3 . . . , etc. to provide an output as illustrated, for example, in plot 314. The center frequencies f1, f2, f3 . . . , may be positioned mid-way between channel center frequencies associated with the predetermined channel separation.

Figure 4:
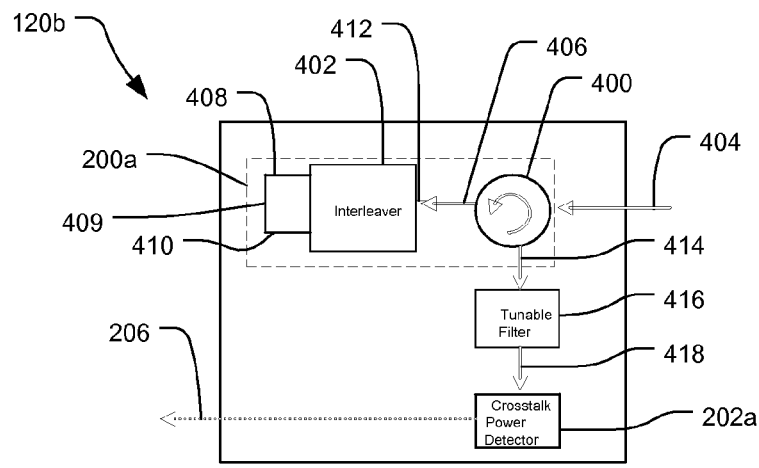
FIG. 4 is a simplified block diagram of another exemplary aggregate channel monitor consistent with the present disclosure.

A comb filter 200 having a transmission characteristic centered on the crosstalk between adjacent channels may be provided in a variety of configurations. FIG. 4, for example, illustrates one exemplary embodiment 120b of an aggregate channel monitor consistent with the present disclosure, wherein a comb filter 200a is established using an optical circulator 400 and an optical interleaver 402.

A variety of optical circulator 400 and interleaver 402 configurations are known to those of ordinary skill in the art. In general, an optical circulator may be a passive optical device with three or more ports configured such that when a signal is fed into any port it is transferred to the next port. An optical interleaver may be a passive device that may be used to combine odd and even sets of WDM channels provided at respective ports, into an aggregate signal at another port in an interleaving manner, or divide an aggregate WDM signal into odd and even channels at respective output ports. In the illustrated exemplary embodiment, the interleaver 402 may have the same period as the predetermined channel spacing. In one embodiment, for example, in a system with predetermined channel spacing of 33 Ghz, the interleaver may be a 33 GHz interleaver available from Optoplex Corporation of Fremont, Calif.

In the illustrated exemplary embodiment, the aggregate signal from path 102 is provided at a first input port 404 of the circulator 400 and transferred to another port 406 coupled to an aggregate channel port 412 of the interleaver 402. The odd channel port 408 of the interleaver 402 may output the odd channels of the aggregate signal and the even channel port 410 of the interleaver 402 may output the even channels of the aggregate signal. With reference to FIG. 3, for example, plot 304 may represent the output at odd channel port 408 and plot 308 may represent the output at the even channel port 410.

As shown, the interleaver odd 408 and even 410 channel ports may be directly coupled, e.g. by path 409. In this configuration, the odd channels may be input to the even channel port 410 and the even channels may be input to the odd channel port 408. The output at the aggregate channel port 412 therefore is an aggregate signal including the intersection between the even channel and the odd channel frequency grid associated with the odd port 408 interleaved with the intersection between the odd channels and the even channel frequency grid associated with the even port 410. In other words, the output of the interleaver 412 provided as an input to the port 406 of the circulator 400 represents the crosstalk between adjacent channels in the aggregate signal on path 102. The combination of the circulator 400 and interleaver 402 with the interleaver odd 408 and even 410 ports coupled, as shown, establishes a comb filter 200a having a transmission characteristic with center frequencies centered on the crosstalk between adjacent channels. With reference to FIG. 3, for example, the plot 314 may represent the output of the interleaver provided at the input to port 406 of the circulator.

The output of the interleaver provided at port 406 of the circulator 400 may be transferred to port 414 of the circulator 400. In the illustrated exemplary embodiment, a tunable filter 416 is coupled to port 414. The tunable filter 416 may be configured to scan the output at port 414 across the transmission bandwidth of the aggregate signal to provide an output 418 to a crosstalk detector 202a. The crosstalk detector 202a may receive the filter output 418 and detect the crosstalk power between adjacent channels of the aggregate signal. The crosstalk detector 202a may provide an output 206 including data representing the crosstalk power and/or peak level between adjacent channels across the entire transmission bandwidth of the aggregate signal.

Figure 5:
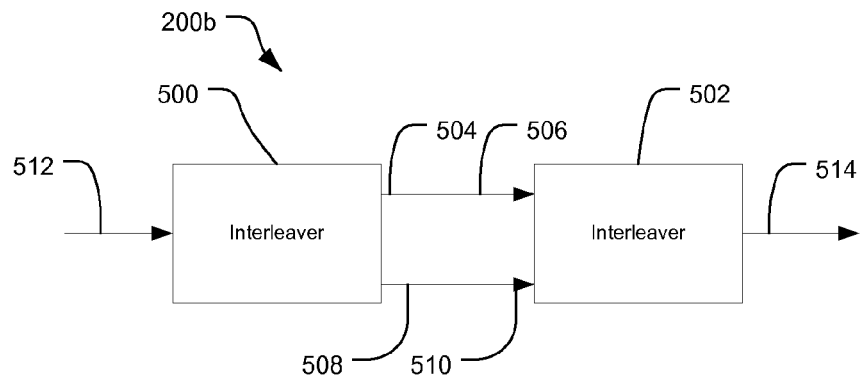
FIG. 5 is a simplified block diagram of an exemplary comb filter consistent with the present disclosure.

Other configurations for achieving a comb filter 200 having a transmission characteristic with center frequencies centered on the crosstalk between adjacent channels are possible. FIG. 5, for example, illustrates a comb filter 200b including first 500 and second 502 interleavers wherein an odd port 504 of the first interleaver 500 is coupled to an even port 506 of the second interleaver 502 and an even port 508 of the first interleaver 500 is coupled to an odd port 510 of the second interleaver 502. The illustrated configuration may receive an aggregate signal on input 512 and provide an output 514 representing the crosstalk between adjacent signals of the aggregate signal.

Figure 6:
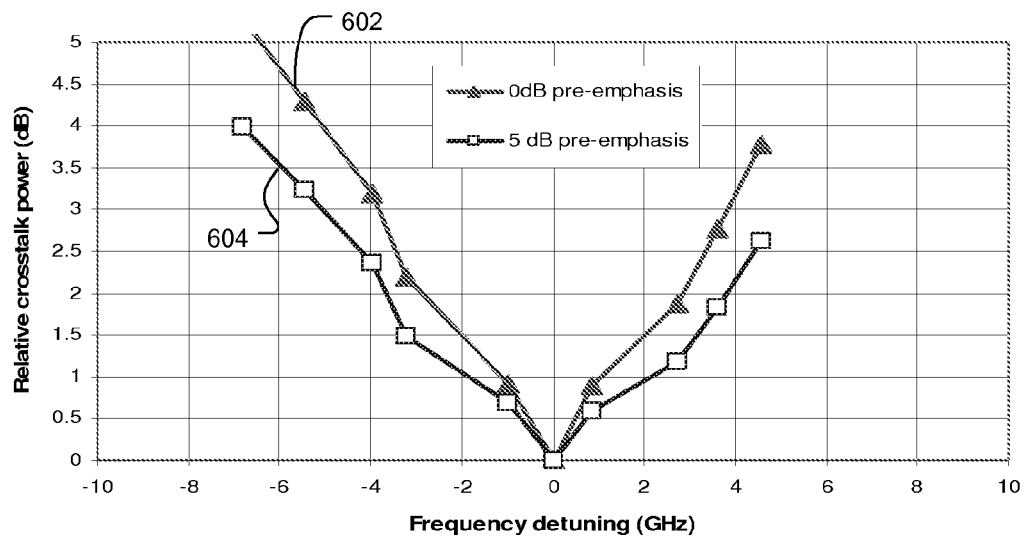
FIG. 6 includes plots of frequency detuning vs. crosstalk power in a system consistent with the present disclosure with different amounts of pre-emphasis.

FIG. 6 illustrates measured sensitivity of crosstalk power vs. center wavelength detuning in an exemplary system consistent with the present disclosure. Plot 602 is a plot of frequency detuning (GHz) for a center channel vs. relative crosstalk power when neighboring channels have no power pre-emphasis relative to the center channel. Plot 604 is a plot of frequency detuning (GHz) for a center channel vs. relative crosstalk power when neighboring channels have a 5 dB power pre-emphasis relative to the center channel. In obtaining the data associated with plots 602 and 604, the center wavelength was detuned from 1550.65 nm, and the wavelength of the neighboring channels was fixed. The data was obtained using a configuration consistent with the embodiment illustrated in FIG. 4. An optical spectrum analyzer (OSA) with a 0.2 nm BW, produced by Ando Electric Company, Ltd. of Tokyo, JP, was used as a tunable filter 416, and an Optoplex 33 GHz interleaver was used as the interleaver 402. The interleaver carrier-to-side band ratio was to 7 dB. The transmission format for all channels was DPSK.

As shown in plot 602, a center channel that is detuned by 1 GHz may cause a crosstalk power increase of about 0.5 dB (with neighboring channels on). In such a system using an appropriate crosstalk detector 202, e.g., including a logarithm amplifier that can deliver ±0.1 dB power accuracy, less than 200 MHz wavelength positioning accuracy may be achieved in the illustrated exemplary system. Also, plot 604 illustrates that a significant degree of interchannel pre-emphasis may be accommodated without significantly affecting the crosstalk power measurement. Plots 602 and 604 show a negligible difference between 5 dB pre-emphasis and 0 dB pre-emphasis of the neighboring channels when the wavelength is detuned less than ±1 GHz.

Figure 7:
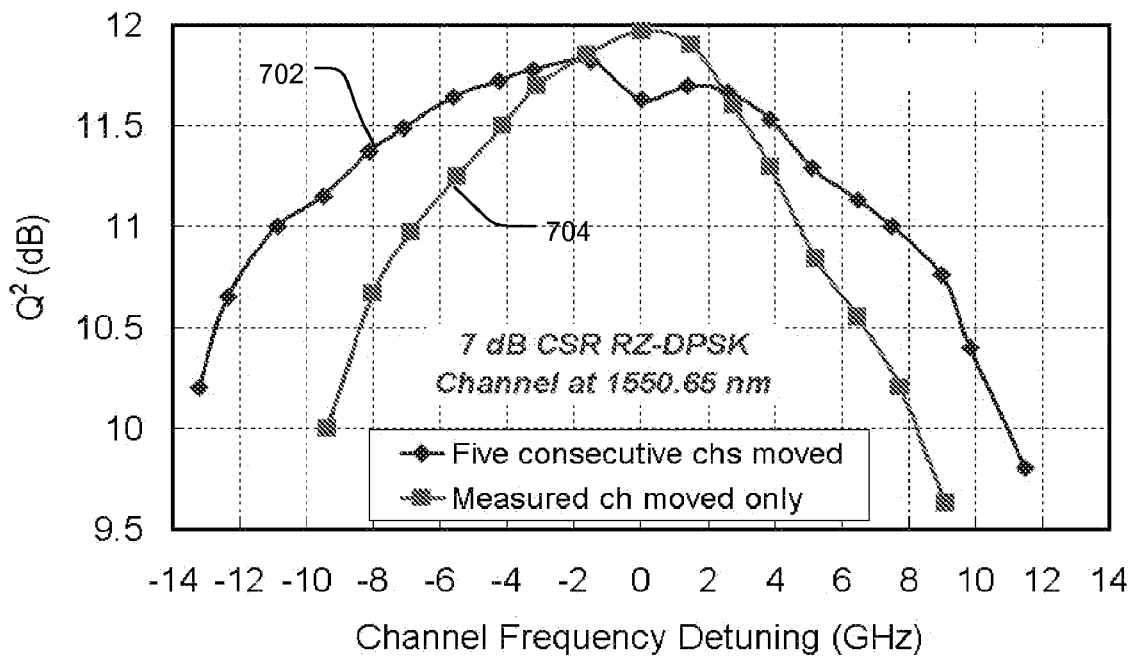
FIG. 7 includes plots of frequency detuning vs. Q performance of a center channel in a system consistent with the present disclosure.

One consideration in a system consistent with the present disclosure may be alignment of the aggregate signal channel spacing with the demultiplexer 114 at the receiver 106. Offset in the grid frequency established by an aggregate channel monitor 120 consistent with the present disclosure and the demultiplexer 114 in the receiver may introduce linear crosstalk. FIG. 7, however, illustrates that there may be only a minimal penalty when five consecutive 33 GHz spaced data channels are simultaneously detuned by ±4 GHz relative to the demultiplexer 114 in an exemplary system consistent with the present disclosure.

Plot 702 is a plot of channel frequency detuning vs. Q performance of a center channel at 1550.65 nm when the wavelengths of five consecutive channels after the center channel were simultaneously detuned. Plot 702 thus shows the Q-penalty with simulated misalignment between aggregate channel monitor 120 and the demultiplexer 114 in the receiver. Plot 704 is a plot of channel frequency detuning vs. Q performance of the center channel when only the center channel was detuned. Plot 704 thus shows the Q-penalty when the channel spacing between neighboring channels is less than nominal frequency grid. The data illustrated in FIG. 7 was obtained from a trans-Atlantic system using a configuration consistent with the embodiment illustrated in FIG. 1, a 33 GHz channel spacing, parallel launch, and return-to-zero (RZ)-DPSK modulation format.

As shown, the center channel Q performance may be relatively insensitive to an offset between the grid frequency established by an aggregate channel monitor 120 and a demultiplexer 114 in the receiver. Nonlinear transmission crosstalk effects, e.g. from cross phase modulation (XPM) and/or four wave mixing (FWM), may induce a higher penalty than offset between aggregate channel monitor grid and the receiver demultiplexer. This insensitivity may be achieved using presently available interleaver technology, which may deliver less than 2 GHz grid frequency error.

With reference again to FIG. 1, the output of the aggregate channel monitor 120 may be coupled to the element management system 122, which may apply a wavelength adjustment algorithm to modify transmitter wavelengths to position the channels in the aggregate signal. The wavelength adjustment algorithm may take a variety of configurations and may be implemented as one or more computer programs or applications, for example, running on a computer system of the element management system 122. Computer programs or applications, such as the wavelength adjustment algorithms, may be stored on a memory in the element management system, or other machine readable medium (e.g., a hard disk, a CD Rom, a system memory, optical memory, etc.) and may be executed by a processor to cause the processor to perform all or part of the functions described herein as being performed by the element management system 122. It is expected that such a computer program product may be distributed as a removable machine-readable medium (e.g., a diskette, CD-ROM), preloaded with a system (e.g., on system ROM or fixed disk), or distributed from a server or electronic bulletin board over a network (e.g., the Internet or World Wide Web). Those of ordinary skill in the art will recognize that the element management system functionality may be implemented using any combination of hardware, software, and/or firmware to provide such functionality.

Figure 8:
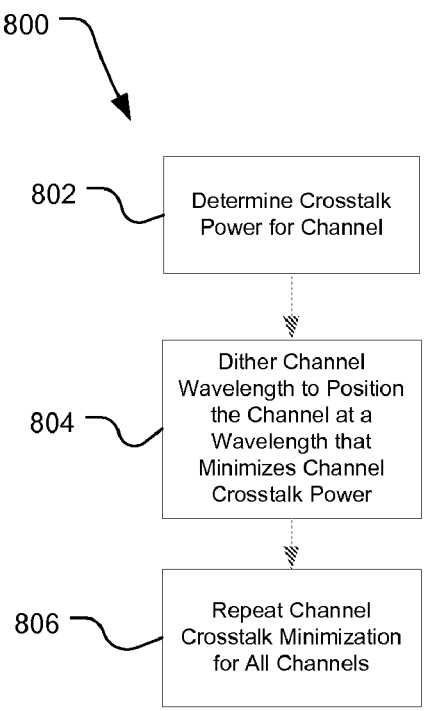
FIG. 8 is a block flow diagram illustrating one example of a wavelength adjustment algorithm consistent with the present disclosure.

In one exemplary embodiment, the wavelength adjustment algorithm may be a wavelength dithering algorithm for minimizing crosstalk power in the output of the aggregate channel monitor. FIG. 8 is a block flow diagram of one exemplary wavelength adjustment algorithm 800 consistent with the present disclosure. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 8, the element management system 122 may determine 802 the total crosstalk power for each channel, i.e. the total power in the low and high frequency crosstalk side bands associated with the channel. The channel wavelength may then be dithered 804 while keeping the rest of channels fixed to minimize the total crosstalk power for the channel. This process may be repeated 806 for each channel in the system.

Figure 9:
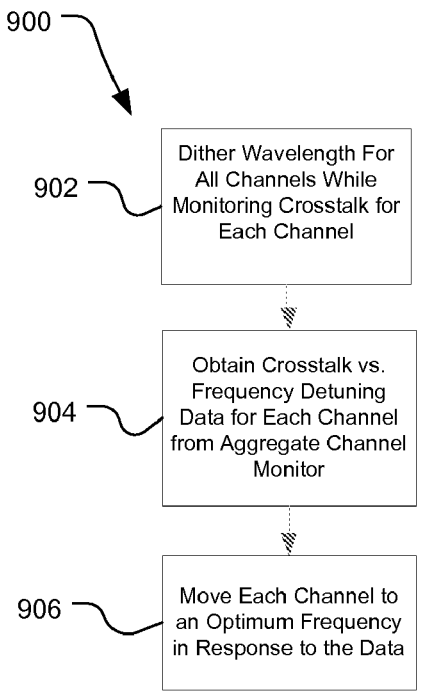
FIG. 9 is a block flow diagram illustrating another example of a wavelength adjustment algorithm consistent with the present disclosure.

FIG. 9 is a block flow diagram illustrating another embodiment of a wavelength adjustment algorithm consistent with the present disclosure. As shown, the element management system 122 may move 902 all channels such that the inter-channel spacing is not changed (reduced) during the tuning process. All of the channels may be moved in the same direction by the same offset while measuring crosstalk for each channel. This may approach may be described as all-channel-synchronous dithering. As illustrated in FIG. 9, simultaneous dithering of consecutive channels by ±2 GHz may introduce a small Q penalty. After moving all channels while measuring crosstalk, crosstalk vs. frequency offset data from the aggregate channel monitor may be obtained 904 and analyzed. Each channel may be moved 906 to an optimum channel frequency in response to the data. For example, for each channel a 2nd-order curve fit to the crosstalk power curve may be used to find an optimum channel frequency.

Figure 10:
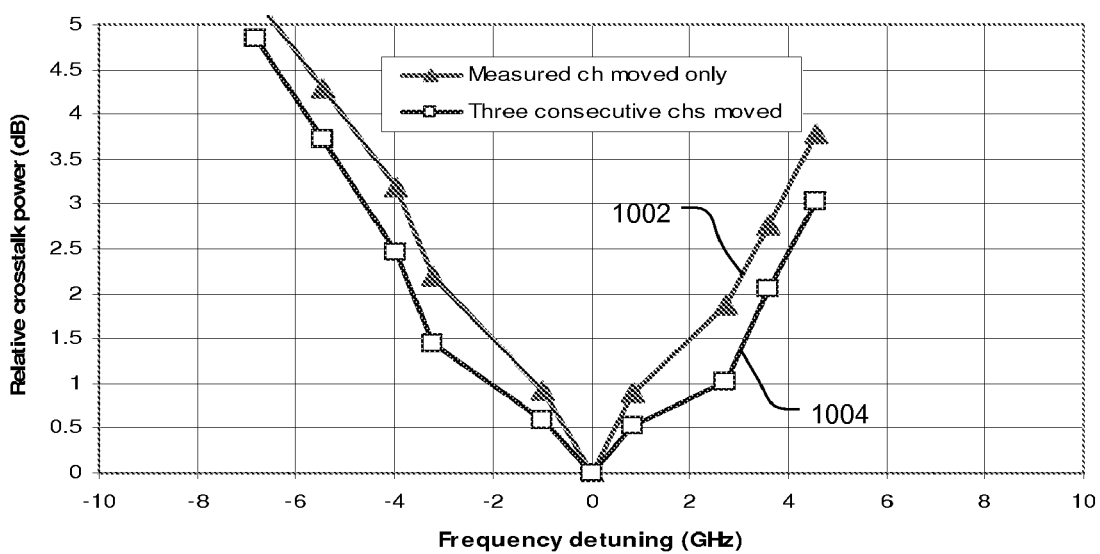
FIG. 10 includes plots of frequency detuning vs. crosstalk power in a system consistent with the present disclosure showing changes in crosstalk power associated with detuning of a center channel and three consecutive channels.

In FIG. 10, plot 1002 is a plot of frequency detuning (GHz) vs. relative crosstalk power when only the measured channel was moved, and plot 1004 is a plot of frequency detuning (GHz) vs. relative crosstalk power when three consecutive channels were moved. The data illustrated in FIG. 10 was obtained using a system configuration as described in connection with FIG. 6. As illustrated by plot 1004, high crosstalk power sensitivity vs. wavelength movement may be achieved using all-channel-synchronous dithering consistent with the present disclosure.

Figure 11:
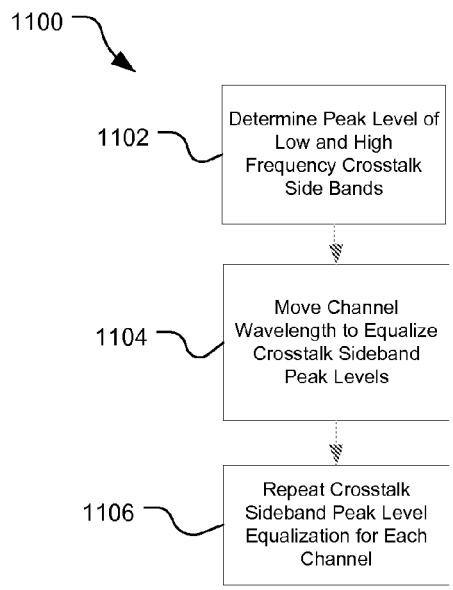
FIG. 11 is a block flow diagram illustrating another example of a wavelength adjustment algorithm consistent with the present disclosure.

FIG. 11 is a block flow diagram illustrating another embodiment 1100 of a wavelength adjustment algorithm consistent with the present disclosure. The illustrated exemplary embodiment may be a non-dithering algorithm configured to equalize linear crosstalk power between a channel and each of its neighboring channels, i.e. as opposed to minimizing the total crosstalk. Minimizing total crosstalk power may locate channel frequencies on the exact frequency grid of the comb filter of the aggregate channel monitor, while equalizing neighboring crosstalk may locate a frequency slightly offset from the comb filter grid in a preferable direction.

As shown, the peak level of the high and low frequency crosstalk sidebands for each channel may be determined 1102. The channel wavelength may then be moved 1104 to equalize the peak level of the associated crosstalk side bands. Crosstalk side band peak level equalization may be repeated 1106 for each channel in the system. When all channels in the aggregate channel have equal pre-emphasis a minimum total crosstalk power may occur when the crosstalk sideband power levels are equal. If the peak level of the low-frequency sideband (e.g. portion 316 of plot 314 in FIG. 3) is greater than the peak level high-frequency sideband (e.g. portion 318 in FIG. 3) for a given channel (e.g. channel 310 in FIG. 3) the channel frequency may be moved in a high frequency direction to equalize the two sideband crosstalk peaks.

Figure 12:
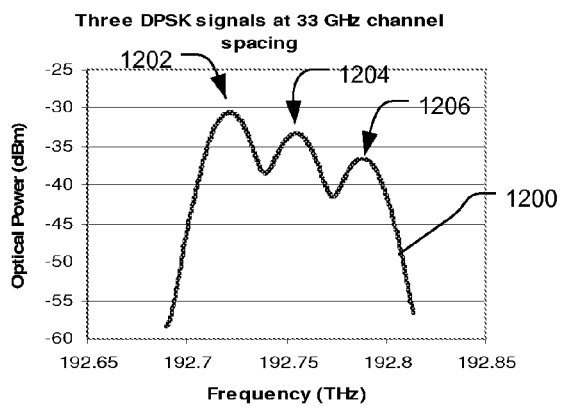
FIG. 12 is a plot of an input signal to an aggregate channel monitor consistent with the present disclosure wherein the input signal includes different pre-emphasis between adjacent channels.
Figure 13:
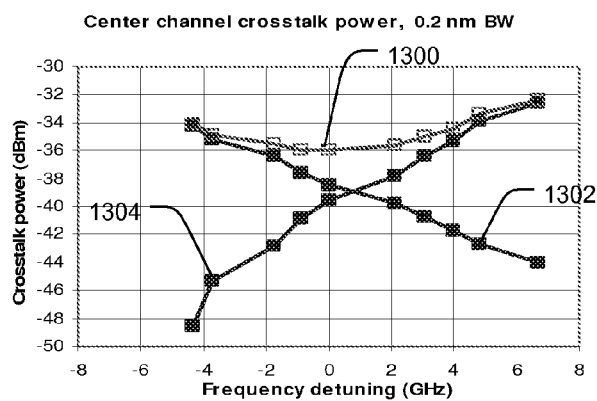
FIG. 13 includes plots of frequency detuning vs. crosstalk power in a system consistent with the present disclosure having an input to an aggregate channel monitor as shown in FIG. 12.

This approach may be applied to systems wherein pre-emphasis exists in the aggregate channel. FIG. 12 includes a plot 1200 of frequency vs. optical power for three channels, 1202, 1204, 1206, with approximately a 3 dB power difference between each of the neighboring channels entering an aggregate channel monitor consistent with the configuration of FIG. 4. FIG. 13 includes plots of frequency detuning vs. crosstalk power for the input channels illustrated in FIG. 12. Plot 1300 illustrates a total measured total crosstalk power of the center channel. Plots 1302 and 1304 illustrate the crosstalk power for each sideband as the center channel frequency is detuned. As shown, the sideband crosstalk powers intersect at a frequency approximately 1 GHz offset from the minimum total crosstalk power point shown in plot 1300. Also, the equalization point of the plots 1302 and 1304 is shifted in the high frequency direction away from the higher-power channel 1202.

In one embodiment, the aggregate channel monitor 120 may scan an aggregate signal and provide the crosstalk sideband spectrum (or the peaks vs. frequency) at an input to the element management system 122. The non-dithering wavelength adjustment algorithm may then step-wise select two transmitters associated with the highest sideband power and move the frequencies of these transmitters a small frequency step away from the center frequency of the highest sideband power. The algorithm may then obtain an updated crosstalk sideband spectrum from the aggregate channel monitor to operate again on the transmitters associated with the highest sideband peak. The process may continue until all sideband peaks in the crosstalk spectrum have substantially similar magnitudes.

Figure 14:
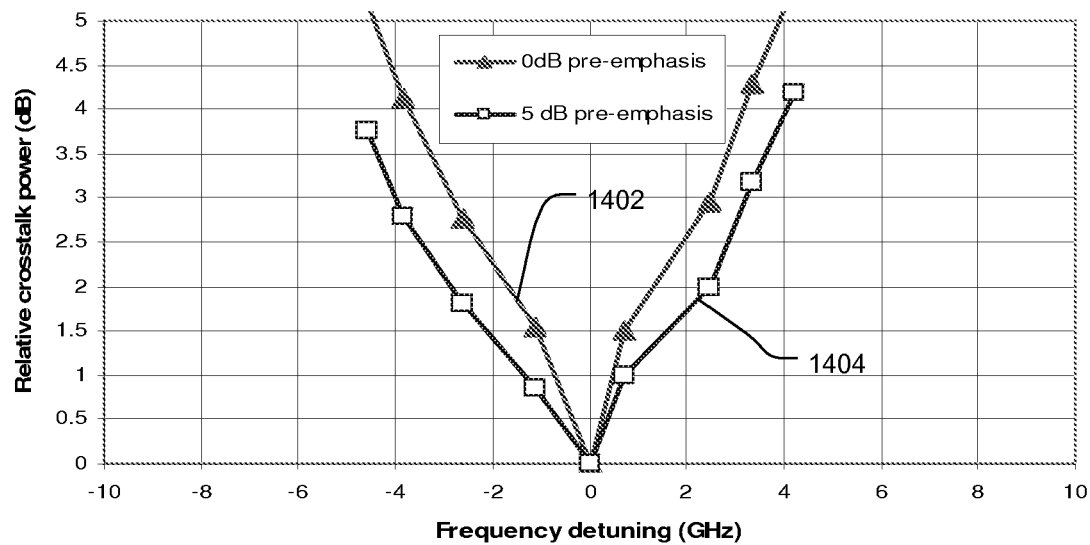
FIG. 14 includes plots of frequency detuning vs. crosstalk power in another system consistent with the present disclosure with different amounts of pre-emphasis.
Figure 15:
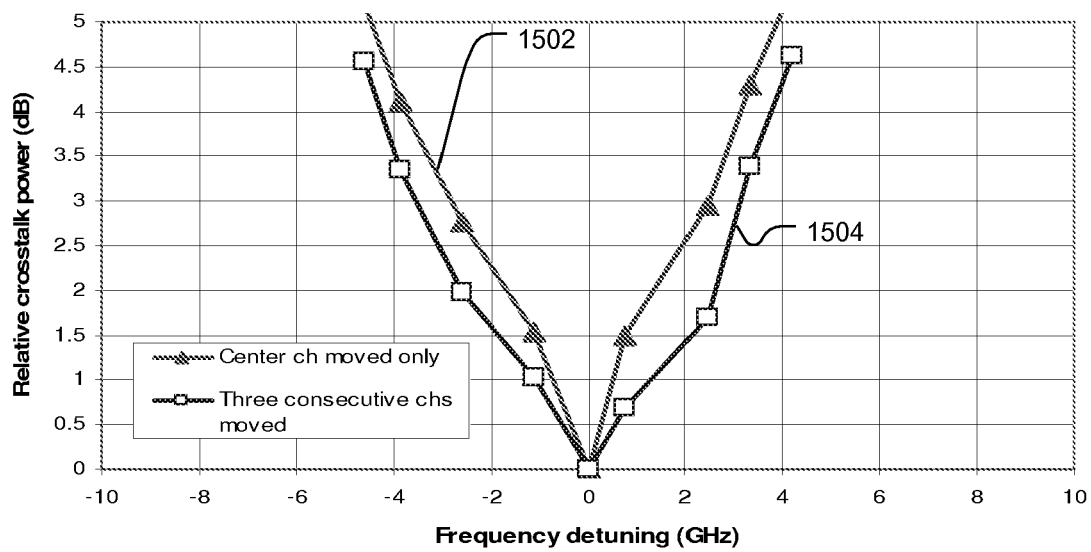
FIG. 15 includes plots of frequency detuning vs. crosstalk power in another system consistent with the present disclosure showing changes in crosstalk power associated with detuning of a center channel and three consecutive channels.

A system consistent with the present disclosure may be configured for operation with narrow channel spacing. FIGS. 14 and 15, for example illustrate performance of a system consistent with the present disclosure using 12.5 Gbs DPSK formatted signals and 25 GHz channel spacing. That data plotted in FIGS. 14 and 15 was obtained using a configuration as shown in FIG. 4, and an interleaver and tunable filter as described above in connection with FIG. 6. The interleaver CSR was optimized to 12 dB.

In FIG. 14, plot 1402 is a plot of frequency detuning (GHz) for a center channel vs. relative crosstalk power when neighboring channels have no power pre-emphasis relative to the center channel. Plot 1404 is a plot of frequency detuning (GHz) for a center channel vs. relative crosstalk power when neighboring channels have a 5 dB power pre-emphasis relative to the center channel. As shown, crosstalk sensitivity for 25 GHz channel separation using a 12 dB CSR ratio is improved compared to the sensitivity illustrated in FIG. 6 corresponding to a 33 GHz channel separation and a 7 dB CSR.

FIG. 15 includes plots of measured crosstalk power when three consecutive channels of the same power were offset together. Plot 1502 is a plot of frequency detuning (GHz) vs. relative crosstalk power when only the center channel was moved. Plot 1504 is a plot of frequency detuning (GHz) vs. relative crosstalk power when three consecutive channels were moved. As shown, high crosstalk power sensitivity vs. wavelength movement may be achieved in a system using a 25 GHz channel separation consistent with the present disclosure.

There is thus provided a system and method for wavelength monitoring and control in a WDM optical communication system. According to one aspect of the disclosure, there is provided an aggregate channel monitor for an optical communication system, the aggregate channel monitor includes: a comb filter configured to receive an aggregate signal from the communication system, the aggregate signal including a plurality of optical signal channels, the comb filter having a transmission characteristic configured to provide an output signal representative of crosstalk between the optical signal channels; and a crosstalk detector coupled to the comb filter, the crosstalk power detector being configured to detect the crosstalk between the optical signal channels and provide crosstalk output data representative of the crosstalk.

According to another aspect of the disclosure, there is provided an optical communication system including: a transmitter configured for transmitting an aggregate signal including a plurality of optical signal channels; a receiver coupled to the transmitter through an optical communication path; an aggregate channel monitor including a comb filter configured to receive at least a portion of the aggregate signal, the comb filter having a transmission characteristic configured to provide an output signal representative of crosstalk between the optical signal channels, and a crosstalk detector coupled to the comb filter, the crosstalk power detector being configured to detect the crosstalk between the optical signal channels and provide crosstalk output data representative of the crosstalk; and an element management system coupled to the crosstalk detector and the transmitter, the element management being configured to establish channel spacing in the aggregate signal in response to the crosstalk output data.

According to yet another aspect of the disclosure, there is provided a method of establishing channel spacing in an aggregate optical signal including a plurality of optical signal channels, the method including: filtering the aggregate signal to provide a filter output representative of crosstalk between the optical signal channels; detecting the crosstalk to provide output data representative of the crosstalk between the optical signal channels; and modifying the channel spacing in response to the output data.

The embodiments that have been described herein but some of the several which utilize this invention and are set forth here by way of illustration but not of limitation. Many other embodiments, which will be readily apparent to those of ordinary skill in the art, may be made without departing materially from the spirit and scope of the invention

What is claimed is:

1. An aggregate channel monitor for an optical communication system, said aggregate channel monitor comprising:
   a comb filter configured to receive an aggregate signal from the communication system, the aggregate signal comprising a plurality of optical signal channels, each of said optical signal channels being at a different associated channel center frequency, said comb filter having a transmission characteristic having comb filter center frequencies positioned between said different associated channel center frequencies of said plurality of optical signal channels and configured to provide an output signal representative of crosstalk between said optical signal channels; and
   a crosstalk detector coupled to said comb filter, said crosstalk detector being configured to detect said crosstalk between said optical signal channels and provide crosstalk output data representative of said crosstalk.

2. An aggregate channel monitor according to claim 1, wherein said comb filter center frequencies are positioned mid-way between said channel center frequencies.

3. An aggregate channel monitor according to claim 1, wherein said comb filter comprises an optical interleaver having odd and even channel ports, said odd and even channel ports being directly coupled to each other.

4. An aggregate channel monitor according to claim 3, wherein said comb filter comprises an optical circulator having a first port configured for receiving said aggregate signal, a second port coupled to an aggregate signal input of said interleaver, and a third port providing said output signal representative of crosstalk between said optical signal channels.

5. An aggregate channel monitor according to claim 4, said aggregate channel monitor further comprising a tunable filter coupled between said comb filter and said crosstalk detector.

6. An aggregate channel monitor according to claim 1, wherein said comb filter comprises first and second optical interleavers each having odd and even channel ports, said odd channel port of said first interleaver being coupled to said even channel port of said second interleaver and said even channel port of said first interleaver being coupled to an odd channel port of said second interleaver.

7. An aggregate channel monitor according to claim 1, wherein plurality of optical signal channels are separated by a channel spacing of about 33 GHz.

8. An aggregate channel monitor according to claim 1, wherein plurality of optical signal channels are separated by a channel spacing of about 25 GHz.

9. An optical communication system comprising:
   a transmitter configured for transmitting an aggregate signal comprising a plurality of optical signal channels, each of said optical signal channels being at a different associated channel center frequency;
   a receiver coupled to said transmitter through an optical communication path;
   an aggregate channel monitor comprising
   a comb filter configured to receive at least a portion of said aggregate signal, said comb filter having a transmission characteristic having comb filter center frequencies positioned between said different associated channel center frequencies of said plurality of optical signal channels and configured to provide an output signal representative of crosstalk between said optical signal channels, and
   a crosstalk detector coupled to said comb filter, said crosstalk power detector being configured to detect said crosstalk between said optical signal channels and provide crosstalk output data representative of said crosstalk; and
   an element management system coupled to said crosstalk detector and said transmitter, said element management being configured to establish channel spacing in said aggregate signal in response to said crosstalk output data to reduce said crosstalk.

10. A system according to claim 9, wherein said comb filter center frequencies are positioned mid-way between said channel center frequencies.

11. A system according to claim 9, wherein said comb filter comprises an optical interleaver having odd and even channel ports, said odd and even channel ports being directly coupled to each other.

12. A system according to claim 11, wherein said comb filter comprises an optical circulator having a first port configured for receiving said aggregate signal, a second port coupled to an aggregate signal input of said interleaver, and a third port providing said output signal representative of crosstalk between said optical signal channels.

13. A system according to claim 12, said aggregate channel monitor further comprising a tunable filter coupled between said comb filter and said crosstalk detector.

14. A system according to claim 9, wherein said comb filter comprises first and second optical interleavers each having odd and even channel ports, said odd channel port of said first interleaver being coupled to said even channel port of said second interleaver and said even channel port of said first interleaver being coupled to an odd channel port of said second interleaver.

15. A system according to claim 9, wherein plurality of optical signal channels are separated by a channel spacing of about 33 GHz.

16. A system according to claim 9, wherein plurality of optical signal channels are separated by a channel spacing of about 25 GHz.

17. A method of establishing channel spacing in an aggregate optical signal including a plurality of optical signal channels, each of said optical signal channels being at a different associated channel center frequency, said method comprising:

filtering said aggregate signal using a comb filter having a transmission characteristic having comb filter center frequencies positioned between said different associated channel center frequencies of said optical signal channels to provide a filter output representative of crosstalk between said optical signal channels;

detecting said crosstalk to provide output data representative of said crosstalk between said optical signal channels; and modifying said channel spacing in response to said output data to reduce said crosstalk.

18. A method according to claim 17, wherein said output data is representative of a low frequency crosstalk side band and a high frequency crosstalk side band for each of said plurality of said optical signal channels.

19. A method according to claim 18, wherein said modifying comprises modifying a frequency of at least one of said plurality of optical signal channels to minimize said low and high frequency crosstalk side bands associated with said at least one of said plurality of optical signal channels.

20. A method according to claim 18, wherein said modifying comprises modifying a frequency of at least one of said plurality of optical signal channels to equalize said low and high frequency crosstalk side bands associated with said at least one of said plurality of optical signal channels.

* * * * *